United States Patent Office 3,629,271
Patented Dec. 21, 1971

3,629,271
PYRAZOLOPYRIDINE CARBOXYLIC ACID
COMPOUNDS AND DERIVATIVES
Hans Hoehn, Regensburg, Germany, assignor to E. R.
Squibb & Sons, Inc., New York, N.Y.
No Drawing. Filed June 16, 1969, Ser. No. 833,673
Int. Cl. C07d 31/36
U.S. Cl. 260—295.5 B         7 Claims

ABSTRACT OF THE DISCLOSURE

New pyrazolopyridine carboxylic acid compounds and derivatives of the general formula

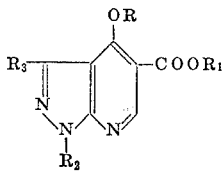

which are antimicrobial agents and central depressants, as well as intermediates therefor, are the subject of this invention.

BRIEF SUMMARY OF THE INVENTION

This invention relates to new pyrazolopyridine carboxylic acid compounds, derivatives thereof and intermediates therefor. The new compounds have the structural formula (I)
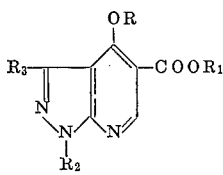

In Formula I, R represents straight or branched alkyl up to 12 carbons, preferably lower alkyl or phenyl-lower alkyl, $R_1$ represents hydrogen or lower alkyl, $R_2$ represents lower alkyl, phenyl-lower alkyl, substituted phenyl-lower alkyl or cycloalkyl-lower alkyl and $R_3$ represents hydrogen, lower alkyl, phenyl or substituted phenyl.

The lower alkyl groups represented by the symbols are straight or branched chain hydrocarbon groups of up to seven carbon atoms such as methyl, ethyl, propyl, isopropyl, butyl, isobutyl, t-butyl, amyl and the like.

Similar lower alkyl groups are part of the phenyl-lower alkyl and cycloalkyl-lower alkyl substituents. The substituted phenyl groups include phenyl rings bearing one or two substituents, e.g., $R_4$, $R_5$-phenyl wherein $R_4$ and $R_5$ each is halogen, especially chlorine or bromine, lower alkyl or lower alkoxy. Thus there are included phenyl, chlorophenyl, e.g., o-, m- or p-chlorophenyl, bromophenyl, e.g., o-, m- or p-bromophenyl, o-, m- or p-tolyl, 2,5-dichlorophenyl, 3,5-dimethylphenyl, 3,4-dimethoxyphenyl, benzyl, phenethyl, o-, m- or p-chlorophenyl, 3,5-dichlorobenzyl, p-methoxyphenyl and the like.

The cycloalkyl groups are cycloaliphatics having three to seven carbons, e.g., cyclopropyl, cyclobutyl, cyclopentyl, cyclohexyl and cycloheptyl.

Preferred compounds of Formula I are those in which R is lower alkyl, especially ethyl, $R_1$ is hydrogen or lower alkyl, especially ethyl, $R_2$ is ethyl or benzyl, especially the first, and $R_3$ is hydrogen.

Intermediates from which the compounds of Formula I are formed have the formula (II) 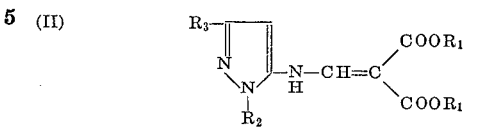

The symbols $R_1$, $R_2$ and $R_3$ have the same meaning as above, except that $R_1$ cannot be hydrogen.

DETAILED DESCRIPTION

In the production of the new compounds of Formula I, cyclization of a compound of Formula II produces a product of Formula I wherein R is hydrogen and $R_1$, $R_2$ and $R_3$ correspond respectively to $R_1$, $R_2$ and $R_3$ of the starting material. This reaction is carried out by heating the 5-pyrazolyl-aminomethylene malonic acid ester of Formula II in an inert organic solvent such as diphenyl ether at a temperature of about 230 to 260° for several hours while removing, e.g., by distillation, the alcohol $R_1$—OH. The product is then separated from the solvent, e.g., by fractional distillation.

The free acid, i.e., $R_1$ is hydrogen, may be obtained from the ester obtained as described above by hydrolysis, e.g., treatment with aqueous sodium hydroxide solution.

Then the products of Formula I wherein R is lower alkyl or phenyl-lower alkyl are produced from those wherein R is hydrogen by alkylation, e.g., treatment of the latter with an alkylating agent such as an alkyl halide or aralkyl halide like ethyl iodide or benzyl bromide, in an inert organic solvent such as dimethylformamide in the presence of an alkali metal carbonate such as potassium carbonate.

The intermediates of Formula II are produced by the reaction of a 5-aminopyrazole of the formula (III) 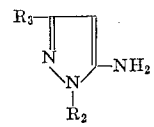

with an alkoxymethylene malonic acid ester of the formula

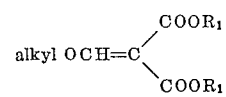
(IV)

e.g., ethoxymethylene malonic acid diethyl ester or the like. This may be effected by heating the reactants at a temperature of the order of 120° C. for several hours.

5-aminopyrazoles of Formula III are produced as described in British Pat. 1,057,740, published Feb. 8, 1967, by ring closure of an aldehyde or ketone hydrazone of the formula (V) 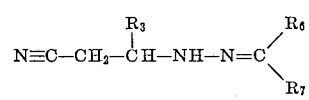

wherein $R_3$ is the same as previously defined and $R_6$ and $R_7$ each is hydrogen, lower alkyl, phenyl or phenyl-lower alkyl. The cyclization is effected by heating at a temperature of about 90° to 120° C. in an inert liquid solvent, e.g., an alcohol like methanol, ethanol, butanol or the like, preferably in the presence of a catalyst, e.g., alcoholates like alkali metal alcoholates particularly butylates such as sodium butylate.

The alkoxymethylene malonic acid esters of Formula IV are known compounds and are produced like ethoxymethylene malonic acid diethyl ester [Organic Syntheses 28, 60–2 (1948)].

The bases of Formula I form salts by reaction with equivalent amounts of the common inorganic and organic acids. Such salts include the hydrohalides, e.g., hydrobromide, hydrochloride, sulfate, nitrate, phosphate, acetate, citrate, oxalate, tartrate, malate, succinate, benzoate, ascorbate, alkanesulfonate, e.g., methanesulfonate, arylsulfonate, e.g., benzenesulfonate, toluenesulfonate, etc. It is frequently convenient to purify or isolate the product by forming an insoluble salt. The base may be obtained by neutralization and another salt then formed by treatment with the appropriate acid.

The compounds of this invention are useful as antimicrobial agents, e.g., in combatting infections due to organisms such as Trichomonas vaginalis, Staphylococcus aureus or Trychophyton mentagrophytes. For example, they may be administered orally to various mammalian species, e.g., mice in an amount of about 5 to 25 mg./kg./day, preferably in 2 to 4 divided doses, in any of the conventional oral dosage forms, or topically in lotions or creams in equivalent amounts. They may be used as surface disinfectants. About 0.01 to 1.0% by weight of any of these substances may be dispersed on an inert solid or in a liquid such as water and applied as a dust or spray or incorporated in a soap or other cleaning agent such as a solid or liquid detergent composition. The latter may be used, for example, in general cleaning, in cleaning dairy barns or dairy, food handling or food processing equipment.

The new compounds of this invention are central nervous system depressants and may be used as tranquilizers for the relief of anxiety and tension states, for example in mice, rats, dogs and other mammalian species, in the same manner as chlordiazepoxide. For this purpose these compounds may be incorporated in a conventional dosage form such as tablet, capsule, injectable or the like, along with the necessary carrier material, excipient, lubricant, buffer or the like, for oral or parenteral administration in single or divided doses of about 1 to 50 mg./kg./day, preferably about 2 to 15 mg./kg., two to four times daily.

The new compounds also increase the intracellular concentration of adenosine-3′,5′-cyclic monophosphate, and thus, by the administration of about 1 to 100 mg./kg./day, preferably about 10 to 50 mg./kg. in single or two to four divided doses, in conventional oral or parenteral dosage forms such as those described above, may be used to alleviate the symptoms of asthma.

The compounds are also useful as intermediates. Those compounds of Formula I wherein $R_1$ forms an ester group may be converted with hydrazine hydrate to 4-substituted hydrazines which may be used in the same manner as above.

Intermediates of Formula II have blood sugar lowering activity and may be administered orally to mammals, e.g., rabbits, at levels of about 10 to 250 mg./day in the forms as discussed above for the central nervous system depressants.

The following examples are illustrative of the invention. All temperatures are on the centigrade scale.

EXAMPLE 1

(a) {[(1-ethyl-5-pyrazolyl)amino]methylene} malonic acid diethyl ester 245 g. 1-ethyl-5-aminopyrazole (2.2 mol.) and 476 g. of ethoxymethylene malonic acid diethyl ester (2.2 mol.) are heated to 120° (bath temperature) for 2 hours with stirring. The ethanol formed by this reaction is removed by means of a water aspirator. Then vacuum distillation (B.P.$_{0.1}$ 154–160°) yields 520 g. (84% of theory) of a quickly crystallizing oil of {[1-ethyl-5-pyrazolyl)amino]methylene} malonic acid diethyl ester, M.P. 50–530°.

The compound is recrystallized from n-hexane, M.P. 55–57°.

The hydrochloride salt is formed by treating the above product with dilute ethanolic hydrogen chloride solution.

(b) 1-ethyl-4-hydroxy-1H-pyrazolo[3,4-b]pyridine-5-carboxylic acid and ethyl ester 253 g. {[(1-ethyl - 5 - pyrazolyl)amino]methylene} malonic acid diethyl ester (0.9 mol.) are dissolved in 770 g. of diphenyl ether. The reaction mixture is heated to 235–250° (bath temperature) and allowed to react at this temperature for 1–2 hours while the resulting ethanol is continuously distilled off. The last amount of alcohol is removed by means of a water aspirator. The diphenyl ether is separated by distillation with a fractionating column in vacuo. The 1-ethyl-4-hydroxy-1H-pyrazolo[3,4-b]pyridine-5-carboxylic acid ethyl ester is obtained at B.P.$_{0.05}$ 115–120°, yield 195 g.=92% of theory, M.P. 85–87°. The compound is recrystallized from benzene (90 to 100°), M.P. 87–89°. Hydrolysis of this product with aqueous sodium hydroxide solution yields 1-ethyl-4-hydroxy-1H-pyrazolo[3,4-b]pyridine-5-carboxylic acid, M.P. 201–202°.

(c) 4-ethoxy-1-ethyl-1H-pyrazolo[3,4-b]pyridine-5-carboxylic acid and ethyl ester In a solution of 259 g. (1.1 mol.) 1-ethyl-4-hydroxy-1H-pyrazolo[3,4-b]pyridine-5-carboxylic acid ester in 1700 ml. of dimethylformamide, 400 g. of well pulverized potassium carbonate and 300 g. of ethyl iodide are introduced. The reaction mixture is stirred for 7 hours at 65° and filtered under suction, while hot, from excess potassium carbonate. Upon standing overnight, 165 g. of 1-ethyl-4-ethoxy-1H-pyrazolo[3,4 - b]pyridine-5-carboxylic acid ethyl ester crystallize out of the solution M.P. 112–115°. After evaporation of the mother liquor, an additional 80 g. are obtained. The total yield amounts to 85% of theory. The compound is recrystallized from benzene (90–100°), M.P. 113–115°.

By hydrolyzing this product as in part (b), 4-ethoxy-1-ethyl-1H-pyrazolo[3,4-b]pyridine-5-carboxylic acid is obtained, M.P. 198–199°.

EXAMPLE 2

(a) 1-benzyl-4-hydroxy-1H-pyrazolo[3,4-b]pyridine-5-carboxylic acid and ethyl ester By substituting an equivalent amount of 1-benzyl-5-aminopyrazole for the 1-ethyl-5-aminopyrazole in the procedure of Example 1, 1-benzyl-4-hydroxy-1H-pyrazolo[3,4-b]pyridine-5-carboxylic acid ethyl ester, M.P. 117–119°, and 1-benzyl-4-hydroxy-1H-pyrazolo[3,4-b]pyridine-5-carboxylic acid, M.P. 197–198°, are obtained.

(b) 1-benzyl-4-ethoxy-1H-pyrazolo[3,4-b]pyridine-5-carboxylic acid and ethyl ester By treatment of 1-benzyl-4-hydroxy-1H-pyrazolo[3,4-b]pyridine-5-carboxylic acid ethyl ester with ethyl iodide according to the procedure of Example 1c, 1-benzyl-4-ethoxy - 1H - pyrazolo-[3,4-b]pyridine-5-carboxylic acid ethyl ester, M.P. 94–96°, is obtained. Then by hydrolyzing as in Example 1b, the free acid is obtained, M.P. 181–182°.

By using the 5-aminopyrazole with the substituents indicated in the first column below in place of 1-ethyl-5-aminopyrazole according to the procedure of Examples 1a and 1b and then alkylating with ethyl iodide, benzyl bromide or other R-halide as in Example 1c, there are obtained the 1H-pyrazolo[3,4-b]pyridine-5-carboxylic acids and esters of Formula I with the substituents indicated in the second column:

| | 5-aminopyrazole | | Pyrazolopyridine | | | |
|---|---|---|---|---|---|---|
| Example | $R_2$ | $R_3$ | R | $R_1$ | $R_2$ | $R_3$ |
| 3 | o-ClC₆H₄CH₂ | CH₃ | C₂H₅ | C₂H₅ | o-ClC₆H₄CH₂ | CH₃ |
| 4 | H⟩—CH₂ | CH₃ | C₂H₅ | C₂H₅ | H⟩—CH₂ | CH₃ |
| 5 | Same as above | H | C₂H₅ | C₂H₅ | Same as above | H |
| 6 | C₃H₇ | H | C₂H₅ | H | C₃H₇ | H |
| 7 | p-ClC₆H₄CH₂ | H | C₂H₅ | C₂H₅ | p-ClC₆H₄CH₂ | H |
| 8 | p-ClC₆H₄CH₂ | H | C₂H₅ | H | p-ClC₆H₄CH₂ | H |
| 9 | C₆H₅CH(CH₃) | CH₃ | C₂H₅ | C₂H₅ | C₆H₅CH(CH₃) | CH₃ |
| 10 | CH₃ | (CH₃)₂CH | C₂H₅ | C₂H₅ | CH₃ | (CH₃)₂CH |
| 11 | C₃H₇ | C₆H₅ | C₂H₅ | C₂H₅ | C₃H₇ | C₆H₅ |
| 12 | C₂H₅ | H | C₆H₅CH₂ | C₂H₅ | C₂H₅ | H |
| 13 | C₆H₅CH₂ | C₆H₅ | C₂H₅ | C₂H₅ | C₆H₅CH₂ | C₆H₅ |
| 14 | C₂H₅ | H | C₁₂H₂₅ | C₂H₅ | C₂H₅ | H |
| 15 | C₂H₅ | H | C₄H₉ | C₄H₉ | C₂H₅ | H |
| 16 | C₂H₅ | H | C₄H₉ | H | C₂H₅ | H |
| 17 | C₂H₅ | H | C₄H₉ | C₂H₅ | C₂H₅ | H |
| 18 | C₂H₅ | H | C₉H₁₉ | C₂H₅ | C₂H₅ | H |
| 19 | C₂H₅ | H | C₉H₁₉ | C₉H₁₉ | C₂H₅ | H |
| 20 | CH₃ | H | C₂H₅ | C₂H₅ | CH₃ | H |
| 21 | CH(CH₃)₂ | H | C₂H₅ | C₂H₅ | CH(CH₃)₂ | H |

What is claimed is:
1. A compound of the formula

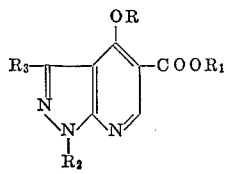

wherein R is lower alkyl or phenyl-lower alkyl, $R_1$ is hydrogen or lower alkyl, $R_2$ is lower alkyl phenyl-lower alkyl, $R_4$, $R_5$-phenyl-lower alkyl or cyclopentyl-lower alkyl, $R_3$ is hydrogen, lower alkyl, phenyl or $R_4$, $R_5$-phenyl, and $R_4$ and $R_5$ each is halogen, lower alkyl or lower alkoxy, and physiologically acceptable acid addition salts thereof.

2. A compound as in claim 1 wherein R, $R_1$ and $R_2$ each is lower alkyl and $R_3$ is hydrogen.

3. A compound as in claim 1 wherein R is phenyl-lower alkyl, $R_3$ is hydrogen, and $R_1$ and $R_2$ each is lower alkyl.

4. A compound as in claim 1 wherein R and $R_1$ each is lower alkyl, $R_2$ is phenyl-lower alkyl and $R_3$ is hydrogen.

5. A compound as in claim 2 wherein each lower alkyl group is ethyl.

6. A compound as in claim 5 wherein each lower alkyl group is ethyl and the phenyl-lower alkyl group is benzyl.

7. A compound as in claim 3 wherein the phenyl-lower alkyl group is benzyl and each lower alkyl group is ethyl.

References Cited

UNITED STATES PATENTS 3,420,813   1/1969   Mueller et al. _____ 260—295 F

ALAN L. ROTMAN, Primary Examiner

U.S. Cl. X.R.

260—294.8 R, 310 R, 999